Patented July 21, 1942

2,290,189

UNITED STATES PATENT OFFICE 2,290,189

CONVERSION OF STRAIGHT CHAIN OLEFINS TO ISOPARAFFINS

Vladimir N. Ipatieff and Herman Pines, Chicago, Ill., assignors to Universal Oil Products Company, Chicago, Ill., a corporation of Delaware No Drawing. Application December 13, 1939, Serial No. 308,997

8 Claims. (Cl. 260—676)

This invention relates to the treatment of straight chain olefinic hydrocarbons or hydrocarbon mixtures containing substantial proportions of straight chain olefins.

More specifically the invention is concerned with a process whereby straight chain olefins are converted into branched chain paraffins, the process involving the use of special catalysts and particular conditions of operation which favor hydrogenation and isomerization so that isoparaffins are formed in relatively high yields.

Normal or straight chain paraffins, which occur in considerable quantities in certain types of petroleum, when subjected to cracking and/or dehydrogenation yield considerable proportions of olefins with straight chain structures. Olefins of this type have a higher antiknock value than that of the original paraffin which was subjected to cracking or to dehydrogenation but because of their unsaturated nature such olefins are not suitable for use in the production of high quality motor fuel to be utilized for aviation purposes. Obviously hydrogenation will convert such olefins into essentially the same type of paraffins as those from which the olefins were derived, namely normal paraffins of relatively low antiknock value. Because of the increasing need for aviation fuel of high octane number the process of this invention is of considerable importance in that it converts straight chain olefinic hydrocarbons of gasoline boiling range into branched chain paraffinic hydrocarbons of higher octane number but of similar boiling range.

In one specific embodiment the present invention comprises a process for producing branched chain paraffinic hydrocarbons of relatively high octane number from normal olefins of similar boiling range which comprises contacting said normal olefins in the presence of hydrogen and a hydrogen halide with a composite catalyst having olefin-hydrogenating and paraffin-isomerizing properties.

We have determined that by the use of the classes of catalysts hereinafter described, and particularly by employing considerable superatmospheric hydrogen pressure, normal olefins may be converted into branched chain paraffins with yields as high as 75%. Isomerization catalysts used in the preparation of the total catalyst composites of the types indicated include aluminum chloride and mixtures of aluminum chloride with other metal halides as those of copper, zirconium, sodium, etc., as such or supported by substantially inert carriers selected from the group consisting of activated carbon, pumice, various types of fuller's earth and clays, particularly those of the montmorillonite or bentonite types, either raw or acid-treated, diatomaceous earth, infusorial earth, kieselguhr, unglazed porcelain, firebrick and, in general, refractory porous substances which have substantially no reactivity with anhydrous aluminum chloride or with the other metal halides which may be added to aluminum chloride for preparation of desired catalyst composites.

Hydrogenation catalysts which may be mixed with an isomerization catalyst in order to form the total composite catalyst include metals such as finely divided nickel, copper, and zinc alone or in combination with one another and preferably supported by a substantially inert refractory carrier. During use these metals are converted, at least in part, into the chlorides by the hydrogen chloride present. Other methods of compositing isomerizing and hydrogenating catalysts may also be employed besides the mechanical mixing hereinabove set forth.

Thus there are several alternative catalysts consisting of aluminum chloride and other metal halides as hereinabove indicated together with hydrogenating catalysts which may be employed in effecting conversion of straight chain olefins into relatively high yields of branched chain paraffin hydrocarbons. While these alternative components of the composite catalyst may be used more or less interchangeably some are more effective than others and accordingly it is not intended to infer that they are definitely equivalent. Also it frequently happens that one type of support or carrier is better than others, depending upon the ratio of chlorides and support found experimentally to be the more suitable for the furtherance of the particular reactions involved and accordingly it is not to be inferred that the supports can at all times be used interchangeably.

Owing to the adsorptive properties of the supports, composite catalysts of the above joint hydrogenating and isomerizing character may be employed in converting normally liquid straight chain olefins into branched chain paraffins of similar boiling range with substantially no tendency for the original particles of catalyst to run together because of the formation of intermediate sludge-like products, so that much larger quantities of olefin-containing hydrocarbon material may be treated before the catalyst has lost its activity. Another advantage resides in the fact that the adsorbed aluminum chloride will remain in place without volatilization at considerably higher temperatures than its normal sublimation point when the hydrocarbon is passed over a stationary section of the granular catalyst composite.

Practical yields of branched chain paraffins are obtainable at temperatures within the approximate range of 100–300° C. under pressures of the order of 1–200 atmospheres and preferably of 10–200 atmospheres at temperatures of 150° C. and higher. Besides depressing the volatilization of aluminum chloride from special composite catalysts, pressure tends also to increase the rate of hydrogenation of the olefins present and at the same time to diminish undesirable side reactions which at atmospheric pressure or at a relatively low pressure would result in the formation of hydrogen and of low molecular weight hydrocarbons. Under the preferred pressures the reaction proceeds more or less in one direction to ultimately produce an optimum yield of branched chain paraffinic hydrocarbons of relatively high octane number.

The process may be operated under batch or continuous conditions and either in liquid, mixed, or vapor phase as may be desirable or expedient in view of the particular combination of catalyst and reactants chosen. A simple method of operation consists in adding 5–10% by weight of the granular composite catalyst to a treating vessel containing hydrocarbons, part or all of which may be olefinic, and subjecting the reaction mixture to agitation. It is preferable to employ a treater which can be sealed from atmospheric contact and which can be operated under pressure if necessary. The composite of isomerizing and hydrogenating catalysts preferably together with a supporting material is then kept in suspension by moderate agitation of the reaction vessel while introducing hydrogen containing small proportions of hydrogen chloride or another hydrogen halide.

In another type of operation which accelerates the rate of conversion of normal olefins into branched chain paraffins, the hydrocarbon mixture may be kept at its boiling point by moderate heating under reflux conditions with a granular catalyst maintained in suspension by the ebullition while hydrogen and a hydrogen halide are added. In this type of operation any desired superatmospheric pressure may be employed to permit the use of any desired temperature. In the case of supported catalyst, the necessary amount of hydrogen chloride may be generated by adding a small amount of water or steam which causes hydrolysis.

Vapor phase continuous operations may be conducted by passing vapors of hydrocarbons including olefins mixed with hydrogen and a small amount of a hydrogen halide over granular catalyst composites, in the form of granules or pellets, which are contained in treating chambers or reactors.

While the reactions by which normal olefins may be converted into branched chain paraffins are not understood clearly or completely, it is probable that the conversion progresses stepwise. This conversion may consist of the addition of hydrogen to the olefinic double bond to produce a normal paraffin which almost simultaneously undergoes isomerization into a branched chain paraffin; or the total conversion may consist first in the formation of a branched chain olefin from the normal olefin followed by the addition of hydrogen to the olefinic bond to produce the isomeric paraffin. It should be pointed out, however, that the total reaction progresses smoothly in the presence of hydrogen producing desired isomeric paraffins with a relatively low order of accompanying side reactions such as the formation of large amounts of normally gaseous hydrocarbons or of relatively high boiling sludge-like materials. The presence of hydrogen is not only essential to the formation of a saturated product of branched chain structure but it has the beneficial effects of decreasing the formation of sludge-like material and consequently of preserving the isomerizing properties of the catalyst composite as a loss in isomerizing activity occurs to a greater extent when a like charge of the hydrocarbon material and an aluminum chloride-containing catalyst is subjected to the same conditions of temperature, pressure, and time.

The following examples are introduced as characteristic of the practical operation of the present process although not with the intention of limiting the scope of the invention in exact correspondence with the numerical data presented since some latitude is possible in the proportions of isomerizing and hydrogenating catalysts and supports; and temperatures and pressures may also be varied within the limits already specified.

*Example I*

A hydrocarbon fraction boiling in the range of 50–200° C. and consisting of 25% by volume of normal olefins and 75% by volume of normal paraffins was contacted, in the presence of 4 mole per cent of hydrogen chloride, with 10% by weight of aluminum chloride and 10% by weight of a nickel-containing hydrogenating catalyst at 200° C. under a hydrogen pressure of 100 atmospheres. The olefin-containing hydrocarbon mixture charged had an octane number of 43 while the completely paraffinic product obtained had an octane number of 41. The latter result indicated that the olefins present in the charge were converted into isomeric paraffins with approximately 105 blending octane number since hydrogenation alone in the presence of a nickel catalyst produced an essentially normal paraffinic product with 23 octane number.

*Example II*

A hydrocarbon fraction of 60–210° C. boiling range containing 80% by volume of normal olefins and 20% by volume of normal paraffins and having 65 octane number was commingled with an equal molecular quantity of hydrogen and 4 mole per cent of hydrogen chloride and passed at a temperature of 250° C. under a pressure of 150 atmospheres through a reactor containing a composite of 20% by weight of aluminum chloride, 10% by weight of reduced copper, 25% by weight of reduced nickel, and 45% by weight of 4–10 mesh crushed firebrick. When the hydrocarbon fraction was charged at an hourly rate corresponding to one volume of hydrocarbon per volume of reactor space filled with catalyst, a substantially paraffinic product was obtained with similar boiling range and an octane number of 80 which was increased to 95 by addition of 0.1% by volume of lead tetraethyl.

The foregoing specification and examples show clearly the character of the invention and the results to be expected in its application to olefin-containing hydrocarbon mixtures although neither section is intended to unduly limit its generally broad scope.

We claim as our invention:

1. A process for producing branched chain paraffinic hydrocarbons from normally liquid straight chain olefins which comprises contacting said straight chain olefins in the presence of hydrogen and a hydrogen halide with a composite of olefin-hydrogenating and paraffin-isomerizing catalysts at a temperature in the approximate range of 100–300° C.

2. A process for producing branched chain paraffinic hydrocarbons from normally liquid straight chain olefins which comprises contacting said straight chain olefins in the presence of hydrogen and a hydrogen halide with a composite of olefin-hydrogenating and paraffin-isomerizing catalysts at a temperature in the approximate range of 100–300° C. under a pressure from substantially atmospheric to approximately 200 atmospheres.

3. A process for producing branched chain paraffinic hydrocarbons from normally liquid straight chain olefins which comprises contacting said straight chain olefins in the presence of hydrogen and a hydrogen halide with a composite of hydrogenating and aluminum chloride-containing isomerizing catalysts at a temperature in the approximate range of 100–300° C. under a pressure from substantially atmospheric to approximately 200 atmospheres.

4. A process for producing branched chain paraffinic hydrocarbons from normally liquid straight chain olefins which comprises contacting said straight chain olefins in the presence of hydrogen and a hydrogen halide with a composite of a hydrogenating catalyst and aluminum chloride at a temperature in the approximate range of 100–300° C. under a pressure from substantially atmospheric to approximately 200 atmospheres.

5. A process for producing branched chain paraffinic hydrocarbons from normally liquid straight chain olefins which comprises contacting said straight chain olefins in the presence of hydrogen and a hydrogen halide with a composite of a hydrogenating catalyst and a mixture of aluminum chloride with another metal halide at a temperature in the approximate range of 100–300° C. under a pressure from substantially atmospheric to approximately 200 atmospheres.

6. A process for producing branched chain paraffinic hydrocarbons from normally liquid straight chain olefins which comprises contacting said straight chain olefins in the presence of hydrogen and a hydrogen halide with a composite of a hydrogenating catalyst, aluminum chloride, and a substantially inert carrier at a temperature in the approximate range of 100–300° C. under a pressure from substantially atmospheric to approximately 200 atmospheres.

7. A process for producing branched chain paraffinic hydrocarbons from normally liquid straight chain olefins which comprises contacting said straight chain olefins in the presence of hydrogen and a hydrogen halide with a composite of a hydrogenating catalyst, a mixture of an aluminum halide with another metal halide, and a substantially inert carrier at a temperature in the approximate range of 100–300° C. under a pressure from substantially atmospheric to approximately 200 atmospheres.

8. A process for producing branched chain paraffinic hydrocarbons from normally liquid straight chain olefins which comprises contacting said straight chain olefins in the presence of hydrogen and a hydrogen halide with a composite of a nickel-containing hydrogenating catalyst, a mixture of aluminum halide and another metal halide, and a substantially inert carrier at a temperature in the approximate range of 100–300° C. under a pressure from substantially atmospheric to approximately 200 atmospheres.

VLADIMIR N. IPATIEFF.
HERMAN PINES.